United States Patent [19]

Hongu et al.

[11] Patent Number: 5,168,144

[45] Date of Patent: Dec. 1, 1992

[54] ARC WELDING POWER APPARATUS HAVING PLURAL SELECTABLE ELECTRODE FEED QUANTITY SETTINGS

[75] Inventors: Toshinori Hongu, Nishinomiya; Naoki Kawai, Ikeda; Torafumi Takemoto, Toyonaka; Koji Hamamoto, Takarazuka, all of Japan

[73] Assignee: Matsushita Electric Industrial Co., Ltd., Osaka, Japan

[21] Appl. No.: 722,143

[22] Filed: Jun. 27, 1991

[30] Foreign Application Priority Data

Jun. 27, 1990 [JP] Japan .................................. 2-169026

[51] Int. Cl.$^5$ ............................................... B23K 9/12
[52] U.S. Cl. ............................................... 219/137.71
[58] Field of Search ................ 219/137.71, 137.7, 136

[56] References Cited

U.S. PATENT DOCUMENTS

| 3,581,051 | 5/1971 | Brown | 219/137.71 |
| 3,934,110 | 1/1976 | Denis | 219/137.71 |
| 4,430,551 | 2/1984 | Toth | 219/137.71 |

Primary Examiner—Clifford C. Shaw
Attorney, Agent, or Firm—Wenderoth, Lind & Ponack

[57] ABSTRACT

A power apparatus is used in an arc welding device to control a weld operation during a welding start time. An improved arc start performance is obtained in both a cooled condition of the welding wire tip end portion and a red heated condition thereof. A feed quantity of the consumption electrode during the weld start time is changed depending on whether the welding wire tip end portion is cooled or red heated from a prior arc welding operation.

4 Claims, 3 Drawing Sheets

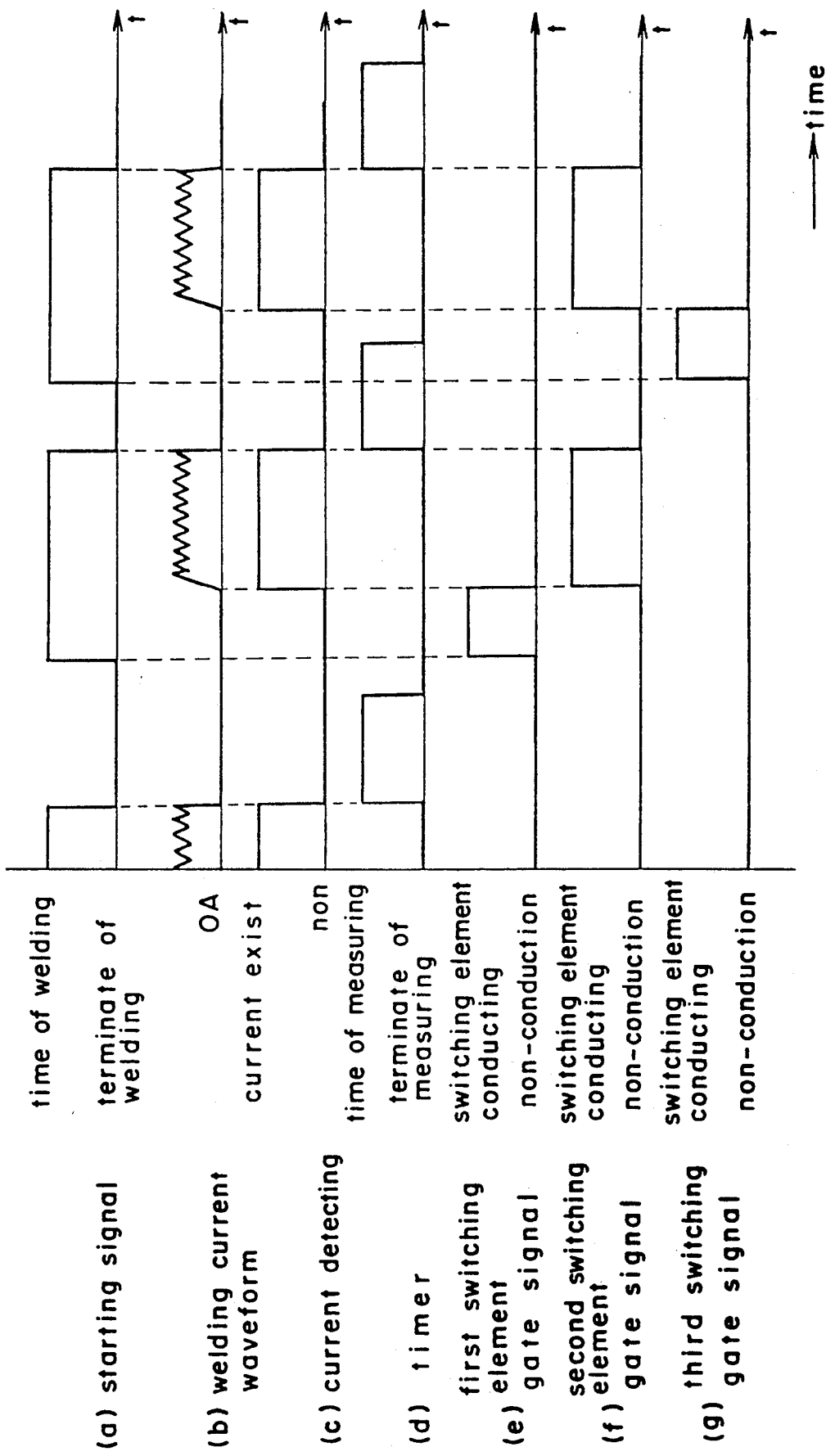

ARC WELDING POWER APPARATUS HAVING PLURAL SELECTABLE ELECTRODE FEED QUANTITY SETTINGS

BACKGROUND OF THE INVENTION

The present invention generally relates to a power apparatus to be used in an arc welding device, and more particularly, to the control operation thereof at a welding start time.

In order to obtain a better arc start performance in an arc welding device, conventionally there has been adopted a hot starting system in which an increased voltage is applied between a welding wire and a mother material during a start operation, the increased voltage being higher than that during the welding operation when a welding current flows between the welding wire tip end portion and the mother material. A wire slow down system has also been adopted in which the feed rate of the welding wire during a welding start operation is slower than that during the welding operation.

When the welding wire tip end portion has been heated to a red hot condition, the arc starting operation is comparatively easy to effect than a case where the welding wire tip end portion has been cooled.

When a next welding operation has been started with the welding wire tip end portion being still heated to a red hot condition after a prior welding has been completed, in the conventional systems, an excessive current is applied to the welding wire thus causing the welding wire to burn or the arc to break, or adversely influencing the bead shape. Further, the conventional wire slow down system has a problem in that the overall welding operation time cannot be shortened due to the slower welding wire feed quantity during a period from the welding start to the flow of the welding current between the welding wire and the mother material even though the red not condition of the welding wire tip end portion remains from the prior welding.

SUMMARY OF THE INVENTION

An important object of the present invention is to provide an arc welding power apparatus, where a better arc start performance is obtained for both a cooled welding wire tip end portion and a red hot weld wire tip end portion, by changing a feed quantity of the consumption electrode from the welding start to the arc production in accordance with whether the welding wire tip end portion is cooled or red hot in the arc welding operation.

Another object of the present invention is to provide an improved arc welding power apparatus, where the overall welding operation time may be shortened, and the welding operation property may be improved.

In accomplishing these and other objects, according to one preferred embodiment of the present invention, there is provided an arc welding power apparatus, which includes a starting signal generator, a discriminating means for discriminating the flow of current between the welding wire and the mother material, a circuit for measuring a given period from a welding completion, a first welding wire feed quantity setter for setting a first welding wire feeding quantity, a second welding wire feed quantity setter for setting the second welding wire feeding quantity, a third welding wire feed quantity setter for setting a third welding wire feed quantity, a first switching element for feeding the above described first welding wire feed quantity to a welding wire feed motor driving circuit, a second switching element for feeding the above described second welding wire feed quantity to the above described welding wire feed motor driving circuit, a third switching element for feeding the above described third welding wire feed quantity to the above described welding wire feed motor driving circuit, a switching element selecting circuit for selecting any one of the above described first switching element, the second switching element and the third switching element.

In the present invention, the temperature of the welding wire tip end portion is monitored for the time period from the welding completion as described hereinabove. When the welding wire tip end portion has been cooled, the feed quantity of the welding wire is made slower than that when the welding wire feed speed is steady during welding. When the welding wire tip end portion is red hot, the feed speed of the welding wire is made faster than in a condition where the welding wire tip end portion has been cooled. A better arc start performance is obtained in a condition where the welding wire tip end portion has been cooled, and in a condition where the welding wire tip end portion has been red heated, thus realizing a reduction in the overall welding operation time.

BRIEF DESCRIPTION OF THE DRAWINGS

These and other objects and features of the present invention will become apparent from the following description taken in conjunction with the preferred embodiment thereof with reference to the accompanying drawings, in which;

FIG. 3 is an operation timing chart of each section.

DETAILED DESCRIPTION OF THE INVENTION

Figure 1:
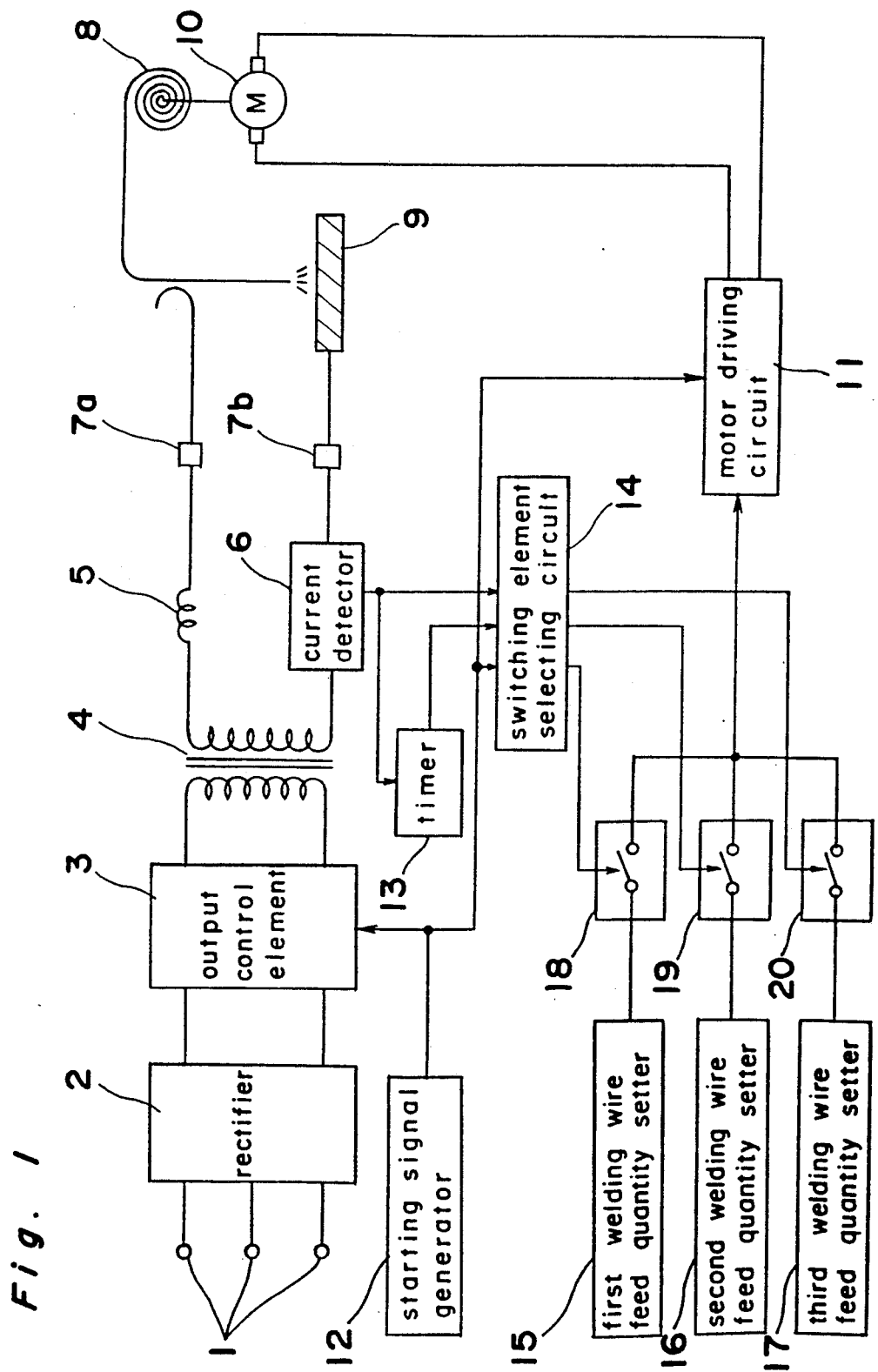
Fig. 1 is a block diagram of an arc welding power apparatus in one embodiment of the present invention.

Before the description of the present invention proceeds, it is to be noted that like parts are designated by like reference numerals throughout the accompanying drawings.

Referring now to the drawings, there is shown in Fig. 1, an arc welding power apparatus according to one preferred embodiment of the present invention, which includes an input terminal 1 of an arc welding machine, a rectifier 2, an output control element 3, a main transformer 4, a reactor 5, a current detector 6, output terminals 7a, 7b, a welding wire 8, a mother material 9, a welding wire feed motor 10, a welding wire feed motor driving circuit 11, a starting signal generator 12, a timer 13, a switching element selecting circuit 14, a first welding wire feed quantity setter 15, a second welding wire feed quantity setter 16, a third welding wire feed quantity setter 17, a first switching element 18, a second switching element 19, a third switching element 20.

Figure 2:
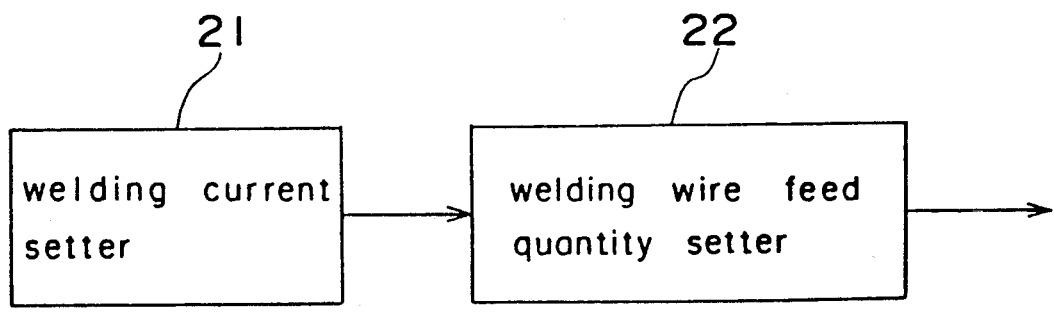
FIG. 2 is a block diagram of a welding wire feed quantity setter.

FIG. 2 shows a block diagram of the respective welding wire feed quantity setters 15, 16, 17. Each welding wire feed quantity setter is composed of a welding current setter 21 and a welding wire feed quantity setter 22.

In FIG. 1, the output terminal 7a is electrically connected with a welding wire 8 through a welding torch not shown, with the output terminal 7b being connected with the mother material 9. The current detector 6 is connected between the output terminal 7b and the main transformer 4. The welding wire 8 is fed at a given speed for the mother material 9 with a welding wire feed motor 10. The output terminal of the starting signal generator 12 is connected with the control input terminal of the output control element 3, the control input terminal of the welding wire feed motor driving circuit 11, and the gate input terminal of the switching element selecting circuit 14. The output terminal of the current detector 6 is connected with the trigger input terminal of the timer 13, and the gate input terminal of the switching element selecting circuit 14. The output terminal of the timer 13 is connected with the gate input terminal of the switching element selecting circuit 14. The output terminal of the switching element selecting circuit 14 is connected with the respective gate input terminals of the first switching element 18, the second switching element 19, and the third switching element 20. The output terminal of the first welding wire feed quantity setter 15 is connected with the input terminal of the first switching element 18. The output terminal of the second welding wire feed quantity setter 16 is connected with the input terminal of the second switching element 19. The output terminal of the third welding wire feed quantity setter 17 is connected with the input terminal of the third switching element 20. The respective output terminals of the first switching element 18, the second switching element 19, and the third switching element 20 are connected with the input terminal of the welding wire feed motor driving circuit 11.

The operation of Fig. 1 will be described hereinafter with the use of the timing chart of FIG. 3.

The starting signal generator 12 outputs starting signal (a) having a first level during welding and a second level when welding is terminated. The welding current detector 6 outputs a welding current detection signal (c) having a first level when welding current (b) flows upon contact between the welding wire 8 and the mother material 9, and having a second level when no welding current (b) is detected. The timer 13 outputs a timing signal (d) having a first level triggered by the falling edge of the output signal (c) of the current detector 6 for a predetermined period, and then having a second level after the lapse of the predetermined period. The switching element selecting circuit 14 outputs a first gate signal (e) having a first level to the gate terminal of the first switching element 18 when the output signal (a) of the starting signal generator 12 is at the first level, the output signal (c) of the current detector 6 is at the second level and the output signal (d) of the timer 13 is at least initially at the second level. The switching element selecting circuit 14 outputs the gate signal (g) having a first level to the gate input terminal of the third switching element 20 when the output signal (a) of the driving signal generator 12 is at the first level, the output signal (c) of the current detector 6 is at the second level, and the output signal (d) of the term 13 is at least initially at the first level. Further, when the output signal (c) of the current detector 6 is at the first level and the output signal (a) of the starting signal generator 12 is at the first level, the switching element selecting circuit outputs a gate signal (f) having a first level to the gate input terminal of the second switching element 19.

In the welding starting operation, the starting signal generator 12 outputs a starting signal to the output control element 3, the welding wire feed motor driving circuit 11, and a switching element selecting circuit 14. The welding power supply applies a welding voltage between the welding wire 8 and the mother material 9 via the reactor 5 in response to the starting signal. The welding wire feed motor driving circuit 11 drives the welding wire feed motor 10 to feed the welding wire 8 into the mother 9. The timer 13 measures the predetermined period from the welding completion by outputting the timing signal to the switching element selecting circuit 14. The switching element selecting circuit 14 closes the first switching element 18 to thus apply the welding wire feed motor driving circuit 11 with the set value of the first welding wire feed quantity setter 15 until the current flows between the welding wire 8 and the mother material 9 when the welding operation has been started after the lapse of the predetermined time from the welding completion. The switching element selecting circuit 14 closes the third switching element 20 to thus apply the set value of the third welding wire feed quantity setter 17 to the welding wire feed motor driving circuit 11 until the current flows between the welding wire 8 and the mother material 9 when the welding operation has been started within the predetermined period from the welding completion. The switching element selecting circuit closes the second switching element 19 to thus apply the set value of the second welding wire feed quantity setter 16 to the welding wire feed motor driving circuit 11 until the end of the welding operation when the current flows between the welding wire 8 and the mother material 9.

The third switching element 20 is only conductive until the current flows between the welding wire 8 and the mother material 9, when the welding operation has been started within the predetermined period from the welding completion, to feed the welding wire 8 with the set value of the third welding wire feed quantity setter 17. Also, the first switching element 18 is only conductive until the current flows between the welding wire 8 and the mother material 9, when the welding operation has been started after the lapse of the predetermined time, to feed the welding wire 8 with the set value of the first welding wire feed quantity setter 15. Further, the second switching element 19 is only conductive until the welding completion when the current flows between the welding wire 8 and the mother material 9 to feed the welding wire with the set value of the second welding wire feed quantity setter 16.

As is clear from the foregoing description, according to the arrangement of the present invention, a better arc start performance is obtained in both a cooled condition of the welding wire tip end portion and a red heated condition thereof by changing the feed quantity of the consumption electrode from the welding start to the arc production. Also, the overall welding operation time may be shortened, and the welding operation property may be improved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An arc welding power apparatus comprising:
   a starting signal generator for generating a weld start signal;
   a welding current detector for discriminating between the presence and absence of a welding current flowing between a consumable electrode and a mother material;

a timer circuit for measuring a predetermined time period when a flow of welding current stops as discriminated by said welding current detector;

electrode feed means for feeding the consumable electrode towards the mother material at a rate in accordance with an electrode feed quantity applied thereto;

first, second and third electrode feed quantity setters for respectively outputting first, second and third electrode feed quantities;

first, second and third switching elements for selectively coupling said electrode feed means to said first second and third electrode feed quantity setters, respectively; and, a selection circuit means for controlling said first, second and third switching elements, said selection circuit means for, when the weld start signal is generated by said starting signal generator within the predetermined time measured by said timer circuit, closing said third switching element to apply only the third electrode feed quantity to said electrode feed means until said welding current detector detects the presence of a welding current, said selection circuit means for, when the weld-start signal is generated after the lapse of the predetermined period of time measured by said timer circuit, closing said first switching element to apply only the first electrode feed quantity to said electrode feed means until said welding current detector detects the presence of a welding current, and said selection circuit means for, when said welding current detector detects the presence of a welding current, closing said second switching element to apply only the second electrode feed quantity to said electrode feed means until a termination of the weld start signal generated by said starting signal generator.

2. An arc welding power apparatus as recited in claim 1, wherein the predetermined period of time is set in accordance with the welding current.

3. An arc welding power apparatus as recited in claim 1, wherein the first, second and third electrode feed quantities are set in accordance with the welding current.

4. An arc welding power apparatus as recited in claim 1, wherein a value of the third electrode feed quantity is greater than a value of the first electrode feed quantity.

* * * * *